No. 828,554. PATENTED AUG. 14, 1906.
H. A. KILBORN & R. MAKER.
METALLIC PACKING.
APPLICATION FILED FEB. 16, 1906.
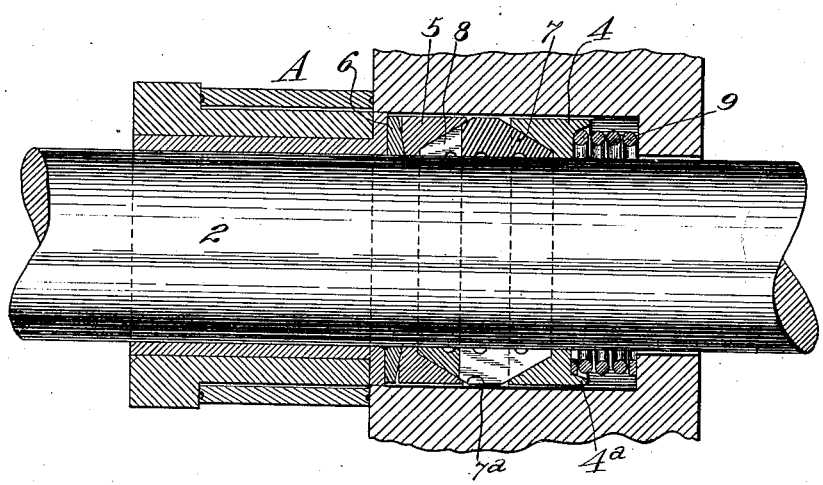
Fig. 1.
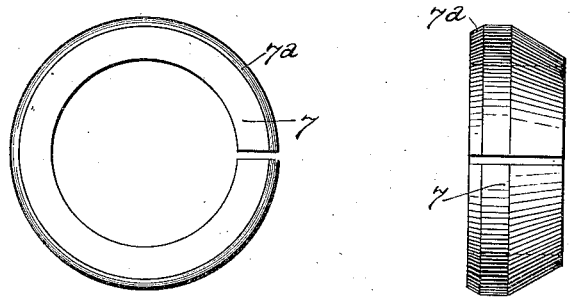 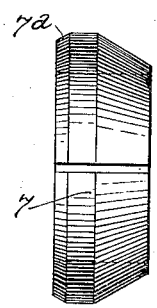
Fig. 2. Fig. 3.

UNITED STATES PATENT OFFICE.

HARRY A. KILBORN, OF DUNSMUIR, AND RUFUS MAKER, OF SACRAMENTO, CALIFORNIA.

METALLIC PACKING.

No. 828,554.  Specification of Letters Patent.  Patented Aug. 14, 1906.

Application filed February 16, 1906. Serial No. 301,522.

*To all whom it may concern:*

Be it known that we, HARRY A. KILBORN, residing at Dunsmuir, Siskiyou county, and RUFUS MAKER, residing at Sacramento, Sacramento county, State of California, citizens of the United States, have invented new and useful Improvements in Metallic Packing, of which the following is a specification.

Our invention relates to improvements in metallic packing; and it consists in the combination of parts and details of construction which will be more fully explained by reference to the accompanying drawings, in which—

Figure 1 is a sectional view of the improved packing. Figs. 2 and 3 are detail views of a member.

A is a stuffing-box, formed with or detachably secured to the cylinder or other part which may contain a reciprocating piston, and 2 is a piston-rod reciprocable freely through a hole in the inner end of the stuffing-box or the cylinder-head to which it appertains.

The outer end of the stuffing-box A may have a gland or cap, through which the piston-rod also passes.

The packing to make a tight joint and prevent the escape of any pressure from the cylinder through the stuffing-box and gland consists of the hard-metal annular rings 4, 5, and 6 and the soft-metal split rings 7 and 8 and in conjunction with these a spring 9, by which the previously-named rings are forced together, and by reason of the peculiar relation of the soft-metal rings 7 and 8 and the conical interiors of the rings 4 and 5 in which they are held the action of this spring constantly compresses the soft-metal rings against the piston-rod and also compensates for the wear of the interior of the rings automatically.

The ring 4 is turned down at its inner end to form a shoulder and projecting flange, as at 4ª, and the spring 9 fits snugly upon this shoulder and is thus maintained in proper relative position with the interior of the stuffing-box and the exterior of the piston-rod, so that in its compression it is held in position.

The joint is formed as follows: The soft-metal ring 8 has its outer surface coned and corresponding in shape with the interior of the ring 5, against which it fits, and the outer end of this soft-metal ring seats against the shoulder formed at the bottom of the interior of the ring 5 and through the opening in which the piston-rod is movable.

The soft-metal ring 7 has its inner end made conical and in like manner fitting into the coned interior of the ring 4. A portion of the ring 7 extending from the base of its cone toward the ring 8 is made cylindrical, and the faces of the two rings are made flat, so as to contact together, and when the packing is first put in there will be a considerable space between the hard-metal rings 4 and 5. As the wear upon the soft-metal rings takes place the ring 7 should follow the ring 8 and gradually enter the ring 5.

An important feature of our invention is the means by which this is effected. It consists in turning the outer end of the cylindrical portion of the ring 7 with a short cone portion 7ª adapted to fit into the cone of the ring 5, and thus insure the advance of the ring as it is gradually compressed by the wear of the piston-rod.

In this manner the packing is always maintained tight until entirely worn out, and it is automatically adjustable, it not being necessary to take the rings out and turn off any portion or otherwise refit them and compensate for wear.

The outer face of the ring 5 is concaved slightly, as shown, and the corresponding contact-face of the ring 6 is similarly convex for the two contacting surfaces, thus forming compensation for any slight irregularity in movement of the piston-rod which passes through them.

In the operation of this packing the spring being fitted against the shoulder of the ring 4, as previously described, has its inner end so formed as to fit squarely against the bottom or inner end of the stuffing-box and maintained, as before described, out of contact with the piston-rod or with the inner periphery of the stuffing-box.

The various rings being put in place, the gland is then drawn down to its position, either by a screw-cap, which may be used on smaller rods, or by follower-bolts in the usual manner of such packing, and in the usual manner of securing the glands of stuffingboxes, and the spring will be compressed into a comparatively small space in the inner end of the stuffing-box. Its pressure acting upon the rings and the cone contacting faces of the outer rings 4 and 5 with the corresponding cone-faces of the rings 7 and 8, and the fact that said rings 7 and 8 are split on the side, causes them to be compressed against the piston-rod. The cut sides of the rings being so placed as to break joints with each other, it will be seen that there will be no leakage between these rings and the piston-rod.

The wear that takes place between the piston-rod and the cones is shown by practice to be at the ends of the soft-metal cones, and as they thus wear to a thin edge by the gradual closing of the rings they are advanced in their cones by the pressure of the spring.

The cone 7 having its outer end made tapering, as at 7ª, as previously described, it will be constantly advanced to follow the cone 8, and its outer end will thus be caused to enter the hard-metal outer cone 5 and follow up the cone 8 until the packing is worn to such a point that it must be renewed. This provides for an automatic adjustment of the packing without any attention until it is necessary to renew.

The outer flat surface of the ring 6 forms a steam-tight joint with the inner face of the gland.

Having thus described our invention, what we claim, and desire to secure by Letters Patent, is—

1. In a metallic packing, the combination with a stuffing-box, and a gland or follower, of complete rings having the interior cone-shaped, the bases of said cones presented toward each other, soft-metal split rings fitting said interior cones, and having their bases in contact, one of said rings being made thicker than the other and having its outer end beveled and adapted to enter the opposite outer cone, and a spring by which said cones are maintained in contact with each other and with the piston-rod.

2. A metallic packing consisting of a plurality of continuous rings having their contiguous interior ends made cone-shaped, split soft-metal rings correspondingly coned and fitting the outer rings, one of said interior rings being of less depth than its containing-socket, and the other having the contiguous end beveled and adapted to enter said socket, an inclosing stuffing-box, a spring compressed between the inner ends of the packing and the bottom of the stuffing-box, a gland or follower closing the stuffing-box, and between which and the spring the packing-rings are automatically adjusted for wear.

3. In a metallic packing, a plurality of continuous or uncut rings through which a piston-rod is reciprocable, said rings having their contiguous ends counterbored in conical form, soft-metal split rings, the interior of which fit the rod and the outer ends of which fit the coned interiors of the outer rings, a stuffing-box within which said rings are contained, a spring located between the inner end of the stuffing-box and the contiguous packing-ring, an exterior ring having its outer surface faced and the inner end convex and fitting the corresponding concavity in the contiguous packing-ring and a gland or follower fitting said faced ring, and between which and the spring the packing-rings are compressed.

4. In a metallic packing, a stuffing-box and a gland or follower therefor, uncut exterior rings having their contiguous ends counterbored in conical form, soft split metal rings having ends coned to fit the coned interiors of the outer rings and having their contiguous surfaces faced to fit, a joint-forming ring at the outer end with which the gland or follower makes a joint, a spring located between the inner end of the stuffing-box and the contiguous solid ring, said ring having a flange and shoulder around which the spring is fitted.

5. In a metallic packing, a stuffing-box, an exterior gland or follower, a spring located at the inner end of the stuffing-box, solid rings having contiguous coned counterbores and interior soft-metal split rings, fitting said counterbores and compressible upon the piston-rod, and a collar and flange formed upon the end of the inner ring adapted to enter the contiguous end of the spring to maintain the latter in position.

6. An automatic metallic packing consisting of soft-metal conical compressible segments, continuous uncut rings of harder metal, having their interior formed to receive the soft-metal cones, with the bases of the latter in contact, a containing-chamber or stuffing-box, and means for applying elastic pressure to advance the soft cones within the outer ones.

7. An automatic metallic packing, consisting of a stuffing-box or chamber, continuous uncut rings with continuous conical interiors, compressible segments of softer material fitting said interiors and having abutting bases, and means for applying elastic pressure to advance and compress the segments within the outer cones.

8. In a metallic packing, the combination with a stuffing-box and gland, of a spring, uncut metal rings with conical interiors, segments of softer metal so disposed between said conical rings as to prevent escape of fluid-pressure, said segments adapted under said pressure and in conjunction with pressure from said spring, to be automatically fed into said conical rings thus compensating for wear on said segments.

9. In a metallic packing, the combination with a piston-rod, stuffing-box and gland, of a spring, continuous conical metal rings, segments of softer metal, so disposed as to prevent escape of pressure, said segments adapted, under said pressure, and the additional pressure from said spring, to be automatically fed into said conical rings, to compensate for wear, one of said exterior rings having a boss or shoulder on which to receive said spring whereby the spring is prevented from coming in contact with the piston-rod.

In testimony whereof we have hereunto set our hands in presence of two subscribing witnesses.

HARRY A. KILBORN.
RUFUS MAKER.

Witnesses to signature of Harry A. Kilborn:
GEORGE H. KILBORN,
J. E. DU BOSE.

Witnesses to signature of Rufus Maker:
C. A. ELLIOTT,
A. C. HINSON.